(12) United States Patent
Routliffe et al.

(10) Patent No.: US 7,076,587 B2
(45) Date of Patent: Jul. 11, 2006

(54) BUFFER MANAGEMENT IN PACKET SWITCHED FABRIC DEVICES

(75) Inventors: Stephen Routliffe, Kanata (CA); Huaiqi Xu, Kanata (CA); Barry Wood, Dunrobin (CA); Victor Menasce, Kanata (CA)

(73) Assignee: Tundra Semiconductor Corporation, Ottawa (CA)

( * ) Notice: Subject to any disclaimer, the term of this patent is extended or adjusted under 35 U.S.C. 154(b) by 230 days.

(21) Appl. No.: 10/439,232

(22) Filed: May 16, 2003

(65) Prior Publication Data

US 2004/0044810 A1 Mar. 4, 2004

Related U.S. Application Data

(60) Provisional application No. 60/378,110, filed on May 16, 2002.

(51) Int. Cl.
*G06F 12/00* (2006.01)
(52) U.S. Cl. .............. 710/210; 710/244; 710/107; 710/36; 710/40; 709/225; 709/250
(58) Field of Classification Search ........... 710/5, 710/29, 36, 40, 49, 52, 56; 709/225, 250
See application file for complete search history.

(56) References Cited

U.S. PATENT DOCUMENTS

| | | | | |
|---|---|---|---|---|
| 5,481,680 A | * | 1/1996 | Larson et al. | 710/112 |
| 5,797,020 A | * | 8/1998 | Bonella et al. | 710/240 |
| 6,035,361 A | * | 3/2000 | Kim et al. | 710/113 |

* cited by examiner

*Primary Examiner*—Kim Huynh

(57) ABSTRACT

A buffer management system for cooperating with a packet based switching system is proposed. The purpose of this system is to reduce traffic congestion, ameliorate its effects, provide fairness to each data source, and to increase functionality while respecting advantageous system characteristics. Fabric output buffers include an arbitration function, a quality of service function, and are associated with individual routing tables. The system uses shallow logic that allows for single clock cycle operation even at high clock speeds. In order to provide for system control of bandwidth, sources with bandwidth practices counter to system interests are addressed. Where there is a conflict of sources over a resource, the buffer management system arbitrates traffic to resolve conflicts in a timely manner while fairly allocating traffic share using a weighted round robin arbitration scheme.

17 Claims, 12 Drawing Sheets

| Has Access to | Port Table of | | | | | |
| --- | --- | --- | --- | --- | --- | --- |
| | 1205 | 1210 | 1215 | 1220 | 1225 | 1230 |
| 1205 | | | X | | | X |
| 1210 | | | X | X | | |
| 1215 | | | X | X | | |
| 1220 | | | X | | | |
| 1225 | | | X | | | |
| 1230 | X | | X | | | |

Figure 13

BUFFER MANAGEMENT IN PACKET SWITCHED FABRIC DEVICES

FIELD OF THE INVENTION

The present invention relates to data networks using a point-to-point, packet switched, fabric architecture, and more particularly to buffer management in packet switched fabric devices.

BACKGROUND OF THE INVENTION

It is the nature of the computer system industry to require an exponential performance advantage over the generations while maintaining or decreasing system costs. In particular, telecommunications and networking systems benefit from a reduction in system size and an increase in capabilities.

Computer system processors and peripherals continually benefit from the aforementioned generation over generation performance advantage. In order to realize a proportional system wide improvement in performance, the connection fabric between devices must improve along with the improvements in processors and peripherals.

A hierarchy of shared buses is a common fabric structure. Levels of performance required for the multiple devices in the system typically differentiate this hierarchy. Bus bridges connect the various buses. In this structure a low performance device does not burden a high performance device.

Providing a wider bus, increasing the bus frequency, pipelining the transactions on the bus, or completing the transactions in an out of order manner can provide additional performance. However, these techniques are well known, and further refinement results in diminishing returns. Further increases in bus width will reduce the maximum possible frequency due to skew effects i.e. as the data-path is altered to include a greater number of data bits, the skew, between those individual bits, originating in the transmission medium, becomes increasingly severe. A wider bus will also increase pin count. This will affect cost, and limit the interfaces on a device. Furthermore, the maximization of frequency and width is incompatible with a multi-device connection. Finally, it would be advantageous to increase the number of devices capable of direct communication.

Therefore, a point to point, packet switched, fabric architecture is displacing traditional memory mapped bus architecture for use in network equipment, storage subsystems and computing platforms capable of providing an interface for processors, memory modules and memory mapped I/O devices.

Modern digital data networks are increasingly employing such point to point, packet switched, fabric interconnect architectures to overcome bandwidth limitations. These networks transmit encapsulated address, control and data packets from the source ports across a series of routing switches or gateways to addressed destinations. The switches and gateways of the switching fabric are capable of determining from the address and control contents of a packet, what activities must be performed.

An efficient packet switching network will strive to meet certain characteristics. In general high throughput is desirable. Throughput is a node-oriented measure of the rate of packet processing. Low latency is another positive characteristic. Latency is a packet-oriented measure of the duration of processing for packets at a node. Latency is a negative characteristic of system performance: Entirely aside from throughput, it is desirable to limit the latency of individual packets. Additionally a network should be fair i.e. it should not unduly favor one port over others in the system. However, an efficient system will respond to the difference in traffic types, if special needs exist, in order to meet those needs.

Certain practices in the art are at odds with some of these goals:

In the absence of proper management, it is possible for devices attached to a network to control bandwidth by using more than their fair share. This can result in unfairness. In the case of multiple unfair devices, queueing delays may get long, traffic classes that require low latency experience long latency and this results in dropped packets and poor signal quality for isochronous traffic.

Where multiple traffic flows compete for access to a resource, additional latency can be introduced. Traditionally solutions result in unfair, or asymmetrical access or access vulnerable to 'bandwidth-hogging'.

In the absence of a system isolation solution, a defective device may also become a rogue transmitter, functioning as a 'bandwidth hog'. The. resulting utilization can impact the latency of legitimate communications. Traditional methods would have to rely on the integrity of the communications channel, or the introduction of a dedicated back channel. Existing routing control access is flat, and does not allow for articulation of access by a port.

In First in First out (FIFO) oriented nodes, there may not be a facility to route traffic, based on the needs of that traffic.

The latency of a packet through that buffer will increase with buffer utilization i.e. as a buffer fills, the delay associated with passing that buffer rises. Some types of traffic (e.g. Voice, Video) are particularly sensitive to packet latency. Identifying and routing latency sensitive packets at high utilization nodes could reduce the detrimental effects of latency.

In FIFO oriented nodes, there may not be facility to promote traffic based on a traffic stall. Packets may block the head of buffer in a 'cannot proceed' condition while packets capable of communication wait behind. Traditionally the packets must simply wait for a proceed condition in the lead packet. This introduces unnecessary latency. Algorithms more sophisticated than FIFO while maintaining compatibility with FIFO-like standards may correct this deficiency in traditional systems.

Finally, certain features are absent in existing systems due to the cycle overhead they would require. Ancillary circuits need to be provided for without impacting the throughput and latency of the system. Any additional functional circuitry (e.g. debug) may increase latency, depending on its design. Prior debug ports for instance might fail to simultaneously mirror the output, introduce latency, or alternatively, force a reduction in clock speed and therefore throughput.

The end points of packet switched architecture contain packet buffers, which are traditionally FIFO memories. These buffers can be a focal point for improved management thus addressing the aforementioned deficiencies of the art.

There is a need to address all the abovementioned circumstances, and furthermore, a need to do so in an efficient manner, using minimal additional circuitry, and most importantly, adding little or no clock overhead to the operation of the buffers.

What is needed is a buffer management system that will have the greatest positive effect on throughput, latency and fairness, and in a manner supportive of ancillary functions.

SUMMARY OF THE INVENTION

Therefore, a buffer management system for cooperating with a packet based switching system is proposed. The purpose of this system is to reduce traffic congestion, ameliorate its effects, provide fairness to each data source, and to increase functionality while respecting advantageous system characteristics.

A packet based switching system or fabric is made up of a switch core and a number of end points. The end points have input and output ports.

It would be advantageous for this packet based switching fabric to use a buffer management system to reduce latency, to minimize latency's negative effects on desired performance, to provide system-implemented fairness between packet sources, and to provide resilience to buffer congestion that results from certain system failure modes such as rogue transmitters, without negatively impacting throughput and latency.

In the buffer management system, the fabric output buffers include an arbitration function. The buffers and fabric include a quality of service function, and the fabric input buffers are associated with individual routing tables.

The advantages of this invention, and the embodiments that deliver them are enumerated:

In order to reduce traffic congestion the system utilizes buffer management to counter head of queue blocking. The system effects dynamic reordering to allow traffic to pass packets in a 'cannot proceed' state. The proposal uses shallow logic, which allows for single clock cycle operation even at high clock speeds i.e. no negative effect on latency and throughput.

It is possible for a given buffer in a switch fabric to become blocked by a packet in a 'cannot proceed' state. In an embodiment corresponding to this difficulty a reordering circuit is disclosed:

That identifies blocked packets based on destination status,

And reorders the oldest unblocked packet to the head of buffer.

In order to provide for system control of bandwidth, sources with bandwidth practices counter to system interests are addressed. Where there is a conflict of sources over a resource, the buffer management system arbitrates traffic to resolve conflicts in a timely manner while fairly allocating traffic share. A weighted round robin arbitration scheme is included in the disclosure. The proposal uses shallow logic, which allows for single clock cycle operation even at high clock speeds i.e. no negative impact on latency and throughput.

1) In one corresponding embodiment a destination arbiter is disclosed:
   That stores a count of allocated requests for sources,
   counts completed requests per source,
   masks a source request in response to exhaustion of the allocation.
   And resets the counts when no valid masked requests exist.
2) In another corresponding embodiment a destination arbiter is disclosed:
   that counts completed requests, and generates a cycle of priority states in response,
   and decodes the priority states and request signals, prioritizes the requests,
   and asserts the highest priority acknowledge in response.

Traffic congestion can also be addressed by implementing "Quality of Service" levels that allow latency sensitive packets to pass congested nodes with a higher priority than non-latency sensitive packets. The buffer management system uses alias addresses or implements multiple fabrics to affect 'Quality of Service' levels where the architecture does not incorporate these levels. The system provides validity and flow tracking for a random access buffer, such that priority order reading is possible where the buffer contains multiple traffic flows. Four embodiments exemplify this aspect:

1) In an embodiment corresponding to the quality level by address aliasing approach a mapping table is disclosed:
   For use with destinations occupying at least one address per quality level,
   The table mapping a packet with a destination and a quality to a particular address of that destination that is set aside for that quality level.
2) In an embodiment corresponding to fabric per quality level, a fabric is disclosed comprising:
   A sub-fabric per quality level,
   Directing circuits per source, cooperating with source buffers to direct outgoing packets to the correct fabric,
   Arbiters per destination, cooperating with sub-fabrics to order incoming packets for the destination.
3) Buffers in this system require a means to process packets of the various levels. In another corresponding embodiment a quality sensitive buffer method is disclosed comprising:
   Storing a head and tail pointer defining the extremes of in-use memory,
   Tracking validity of data between the pointers (set on write, reset on read),
   Storing the quality level in a tag,
   Writing data to the first available invalid location, and resetting the head if necessary,
   And reading data nearest the tail that is also, valid, within the extremes, and associated with the highest in-use priority.
4) The system provides a buffer, useful for the aforementioned purposes, implemented from a random access memory, but effective in tracking allocated and free memory for use in out of order reading/writing. This aspect is directed to priority order read out.

In a corresponding embodiment a queuing method is disclosed for data packets in a memory comprising:

Writing data packets with the steps of:
   Popping a top address off an available address stack,
   Writing incoming data packets to that address,
   And Pushing the top address onto the top of an in-use address stack, And Reading data packets with the steps of:
   Reading another address from the in-use address stack,
   Reading said incoming data packets from the other address,
   and Pushing the new addresses onto the top of the available address stack, It is also advantageous for a buffer management system to provide debugging capability for each buffer that does not affect the performance of the buffer. Connecting a data analyzer directly to the port will load the port to the point where its performance will be compromised. This can be overcome by providing a mirrored debug port. The current invention provides a mirrored debug port in such a way as to not increase the latency of the port.

High-speed electronics involved may be incompatible with ancillary debug circuits necessary for the system. Incorporating a mirror port without increasing latency is desirable. It is an advantage of the current invention to efficiently provide a data mirror port for debug purposes. In a corresponding embodiment, a debug port is disclosed for co-operating with a buffer comprising:

A port for mirroring buffer data

A register for valid data, set by a buffer read/reset by a buffer write,

A register for mirrored data, set by a mirror/reset by a buffer write, write available signals derived from the registers both set.

mirror request signals derived from the valid register set, and the mirror register reset.

An effective buffer management system provides the switch fabric with an appropriate level of fault tolerance. A fault such as a rogue transmitter can greatly affect the latency of the system. Previous systems used a single routing table that provided all ports with equal access. Out of bandwidth means were employed to disable the rogue transmitter or to hold it in reset. This adds to the system overhead. The current invention achieves an advantage over the previous system by providing configurable routing tables for each port. Once a rogue transmitter is identified, the mapping tables can be reconfigured so the port ignores the rogue data. The invention can also be used to provide additional security to the system as it allows fabric segmentation that can make certain ports unreachable.

In a corresponding embodiment, for a switching fabric having ports, an access control mechanism is disclosed comprising:

routing tables, each port having a corresponding table.

BRIEF DESCRIPTION OF THE DRAWINGS

The present invention will be further understood from the following detailed description with reference to the drawings in which:

FIG. 13 illustrates a table of the port access routing of the system disclosed.

DETAILED DESCRIPTION OF THE PREFERRED EMBODIMENT

Figure 1:
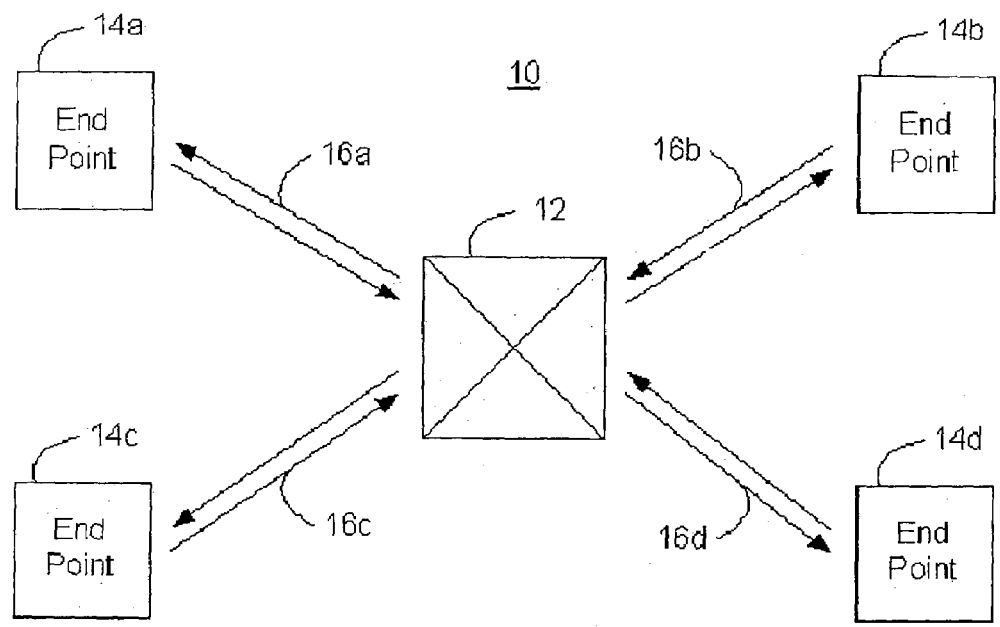
FIG. 1 illustrates in a block diagram, an overall schematic of a network employing a switch fabric.
Figure 2:
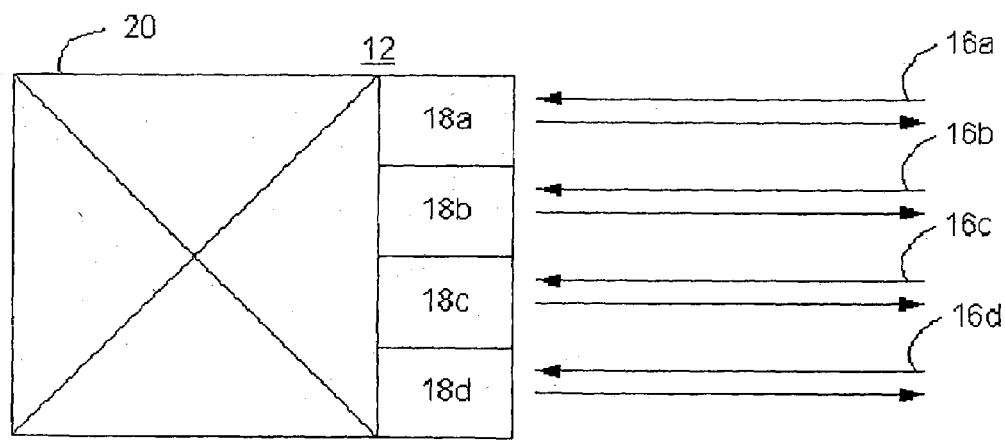
FIG. 2 illustrates in a block diagram, a schematic of a switch fabric.

Referring to FIGS. 1 and 2 there is illustrated, in a block diagram, a packet based switching system. The switching system 10, includes a switch fabric, 12, and end points 14*a*–14*d*, connected to the fabric, 12, by channels, 16*a*–16*d*. The fabric core, 20, is connected to the channels, 16*a*–16*d*, by ports, 18*a*–18*d*. Note that although 4 ports are shown, the number of ports is not fixed. A regional view of the fabric, 12, includes the fabric core, 20, and the ports, 18*a*–18*d*.

When implanting the system of FIG. 1-2 several issues need to be addressed such as queue blocking, quality of service, access control and arbitration.

Figure 3:
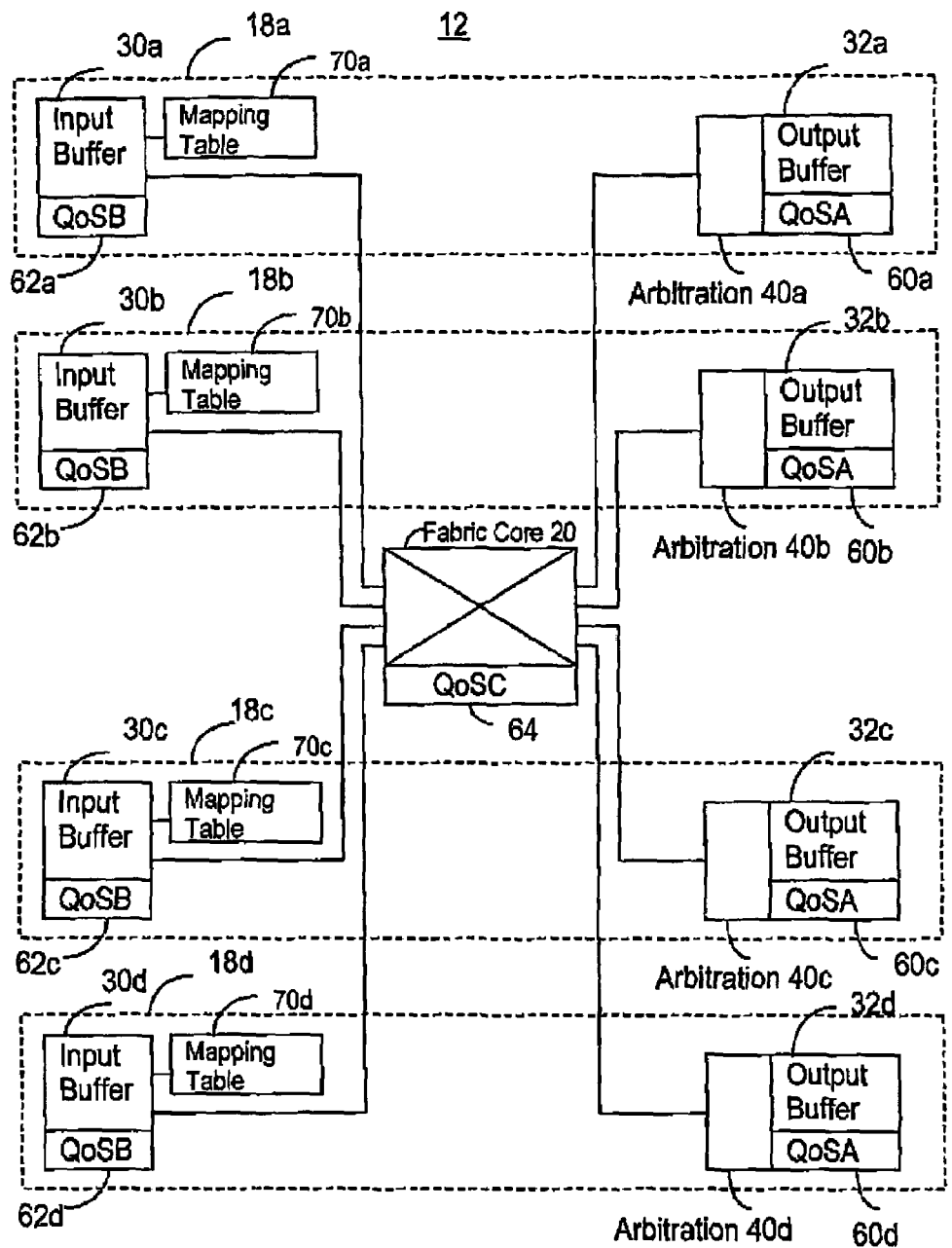
FIG. 3 illustrates in a functional block diagram, an unfolded schematic of a switch fabric of the system disclosed.

Referring to FIG. 3 there is illustrated in a functional block diagram a buffer management system in accordance with an embodiment of the present invention for the packet based switch system of FIGS. 1 and 2.

The ports include a plurality of input buffers, 30*a*–30*d*, and a plurality of output buffers 32*a*–32*d*. The buffer management system includes output buffer based arbitration, 40*a*–40*d*, associated with corresponding outputs, 30*a*–30*d*. The buffer management system includes a quality of service (QoSA) function, 60*a*–60*d*, associated with corresponding output buffers, 30*a*–30*d*. The buffer management system includes a quality of service function associated with the input buffers (QoSB), 62*a*–62*d*, and the switch core, QoSC 64. The buffer management system includes mapping tables, 70*a*–70*d*, corresponding to input buffers, 30*a*–30*d*.

Further details of the buffer management system are provided below.

In order to provide for system control of bandwidth, sources with bandwidth practices counter to system interests need to be addressed. A competition for resources may arise from competing sources, quality of service levels, etc. Where there is a conflict over a resource, the buffer management system arbitrates traffic to resolve conflicts in a timely manner while fairly allocating traffic share.

An exemplary buffer management system responds to such conflicts based on the bandwidth requirements of the packet sources and the allocated bandwidth for those sources. Such response should not introduce unnecessary complications such as additional latency or slower clock speed. A weighted round robin arbitration scheme is included in the disclosure. The proposal uses shallow logic, which allows for single clock cycle operation even at high clock speeds.

Figure 4:
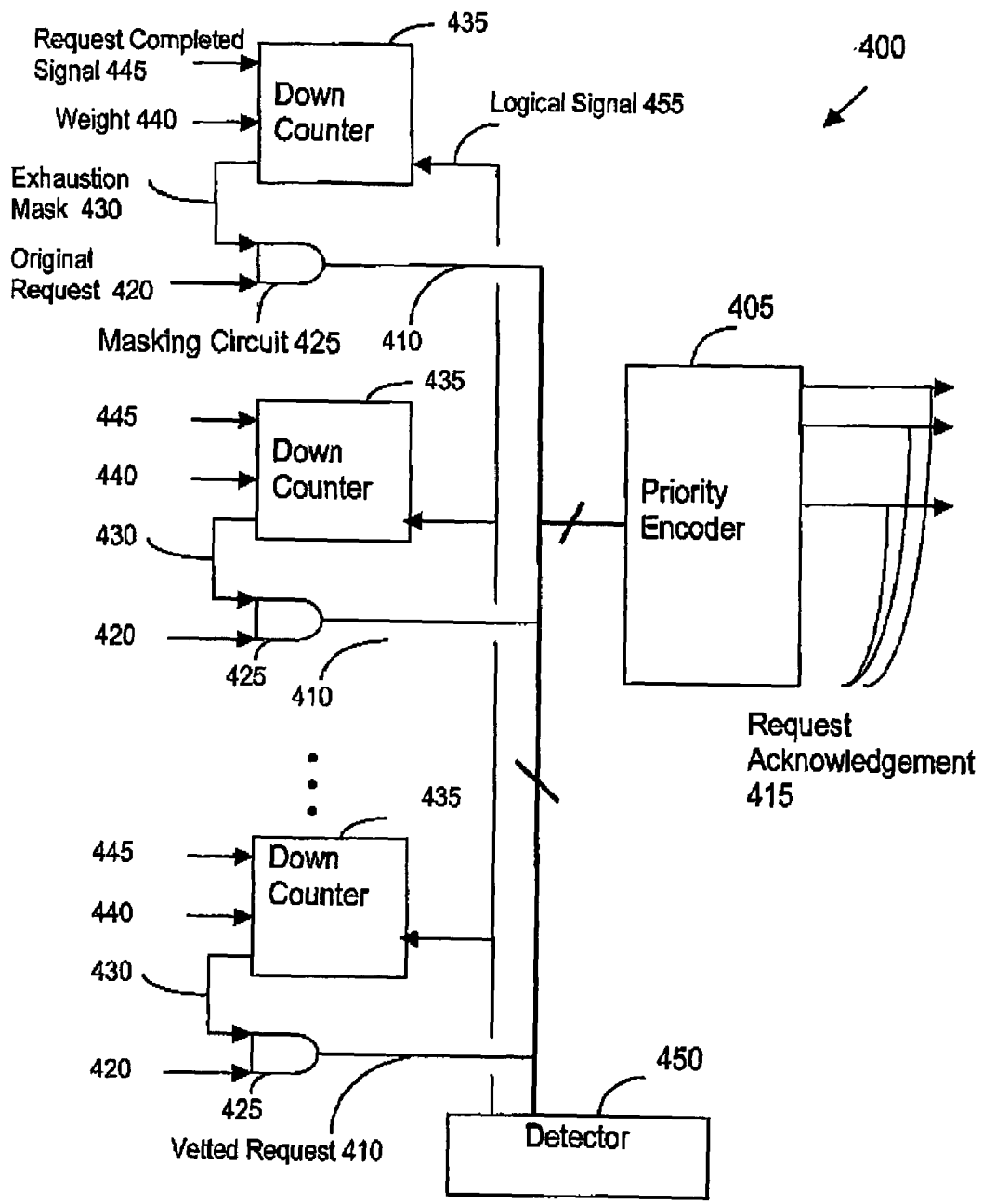
FIG. 4 illustrates one arbiter schematic of the system disclosed.

Referring to FIG. 4 the arbiter 400, is disclosed. The arbiter includes a priority encoder, 405, for selecting one vetted request from a number of vetted requests, 410, and asserting one of several request acknowledgements, 415, in response. The precedence of the responses may be arbitrary, as the fairness is derived form architecture of the arbiter, 400 not the encoder, 405.

The vetted requests, 410 are masked signals, with the original requests, 420, from the source requesters. These original requests, 420, are logically masked by masking circuits, 425, with exhaustion masks, 430. The exhaustion masks, 430, are generated by a down counters, 435, that count down from loaded weights, 440. The exhaustion masks, 430, are coupled to the count< >0 outputs of the counters. The down counters are enabled by the request completed signals, 445, generated by the destination resource.

In order to refresh the counters there is a detector, 450, for identifying when all vetted requests are false. This condition results in the detector, 450, asserting a load signal, 455, that, in turn causes all down counters, 435, to reload the weights, 440.

It can be understood from this architecture that fairness is achieved by restricting any source to a given weight of usage, and that only one clock cycle is required for the counters to acknowledge usage of a unit of allotted weight.

Further, it can be understood that the architecture may be implemented by the substitution of a flip flop for the counter. In this simplified implementation, an un-weighted round-robin arbiter is disclosed.

Figure 5:
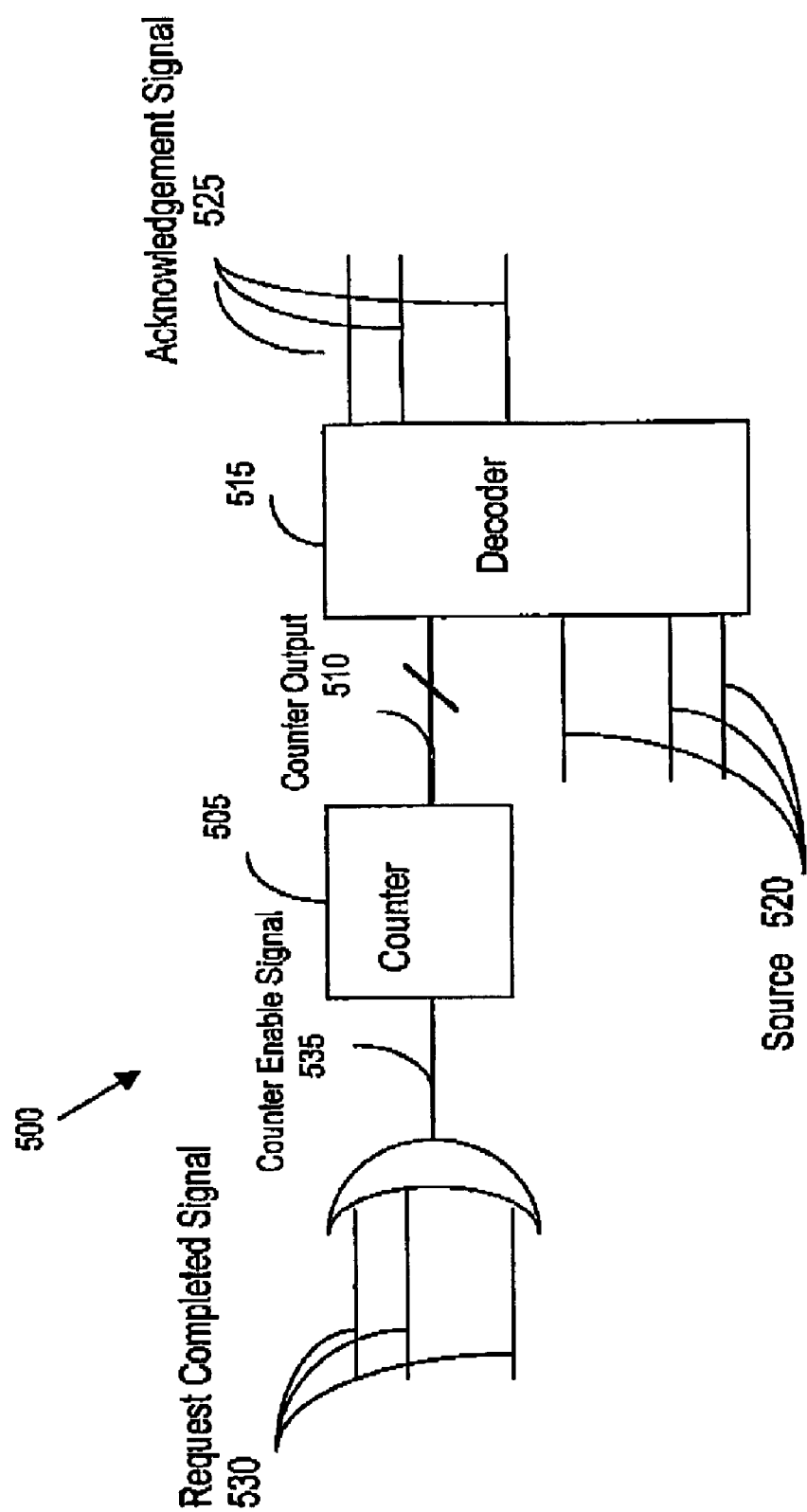
FIG. 5 illustrates another arbiter schematic of the system disclosed.

In another embodiment the same issue is addressed by dynamically sharing priority. Referring to FIG. 5, an arbiter, 500, is disclosed. The arbiter includes a counter, 505, with a counter output, 510, representing the priority state. Thus the counter generates a cycle of priority states. A priority and request decoder, 515, is input coupled to the counter output and to the requests, 515, of the requesting sources, 520. The priority and request decoder, 515, includes logic which for a given priority state will generate a distinct precedence of requests. Thus, the decoder, 515, will assert one of a set of acknowledgement signals, 525, in response to the asserted request and the current precedence. The various request completed signals, 530, generated by the destination, are combined logically to produce a counter enable signal, 535.

In order to reduce traffic congestion the buffer management system must also counter head of queue blocking. The system effects dynamic reordering to allowing traffic to pass packets in a 'cannot proceed' state. The proposal uses shallow logic, which allows for single clock cycle operation even at high clock speeds.

Figure 6:
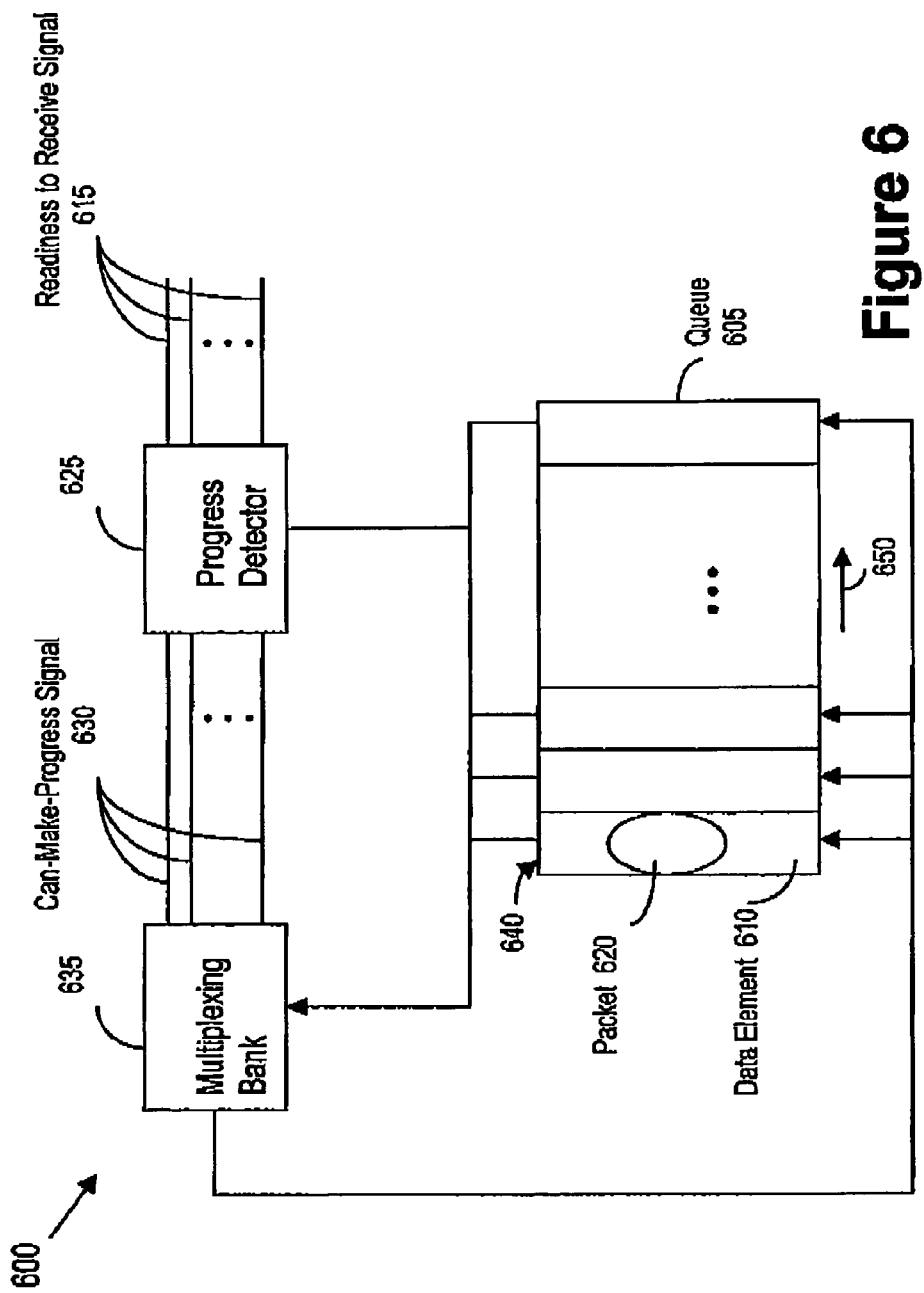
FIG. 6 illustrates a dynamic re-ordering circuit schematic of the system disclosed.

Referring to FIG. 6, disclosed is an embodiment for addressing queue blocking by packets unable to progress in a switching fabric. The embodiment is a re-ordering circuit, 600, for co-operating with one of the sources of the network. The re-ordering circuit, 600, is coupled to queue, 605, of the aforementioned source. The queue has a number of data elements, 610. For each potential destination, the re-ordering circuit receives a readiness to receive signal, 615. The reordering circuit includes a progress detector, 625, coupled to the queue, 605, for inspecting the destination of each data packet, 620, contained in the data elements, 610. The progress detector is also coupled to the readiness to receive signals, 615. This detector determines if each data packet can make progress based on destination (and priority if necessary) and asserts this information on corresponding can-make-progress signals, 630. The multiplexing bank 635 to reorder the packets, 620, in the elements, 610, uses these signals. The element that is nearest the head of queue, 640, and that can make progress is moved to the head of queue, 640. All the remaining packets, 620, between the head, 640, and the promoted packet are shifted one element, 610, tailward 650.

It can be understood from this description that efficient, on the fly, reordering is provided for.

In order to reduce the effects of traffic congestion, the buffer management system allows latency-sensitive packets to pass congested nodes with a higher priority than non-latency sensitive packets by implementing 'Quality of Service' levels. The buffer management system uses alias addresses or implements multiple fabrics to define distinct flows and effect 'Quality of Service' levels where the architecture does not incorporate these levels. This allows the flows to be routed at different levels of priority through the fabric. The system provides validity and flow tracking for a random access buffer, such that priority order reading is possible where the buffer contains multiple traffic flows.

Figure 7:
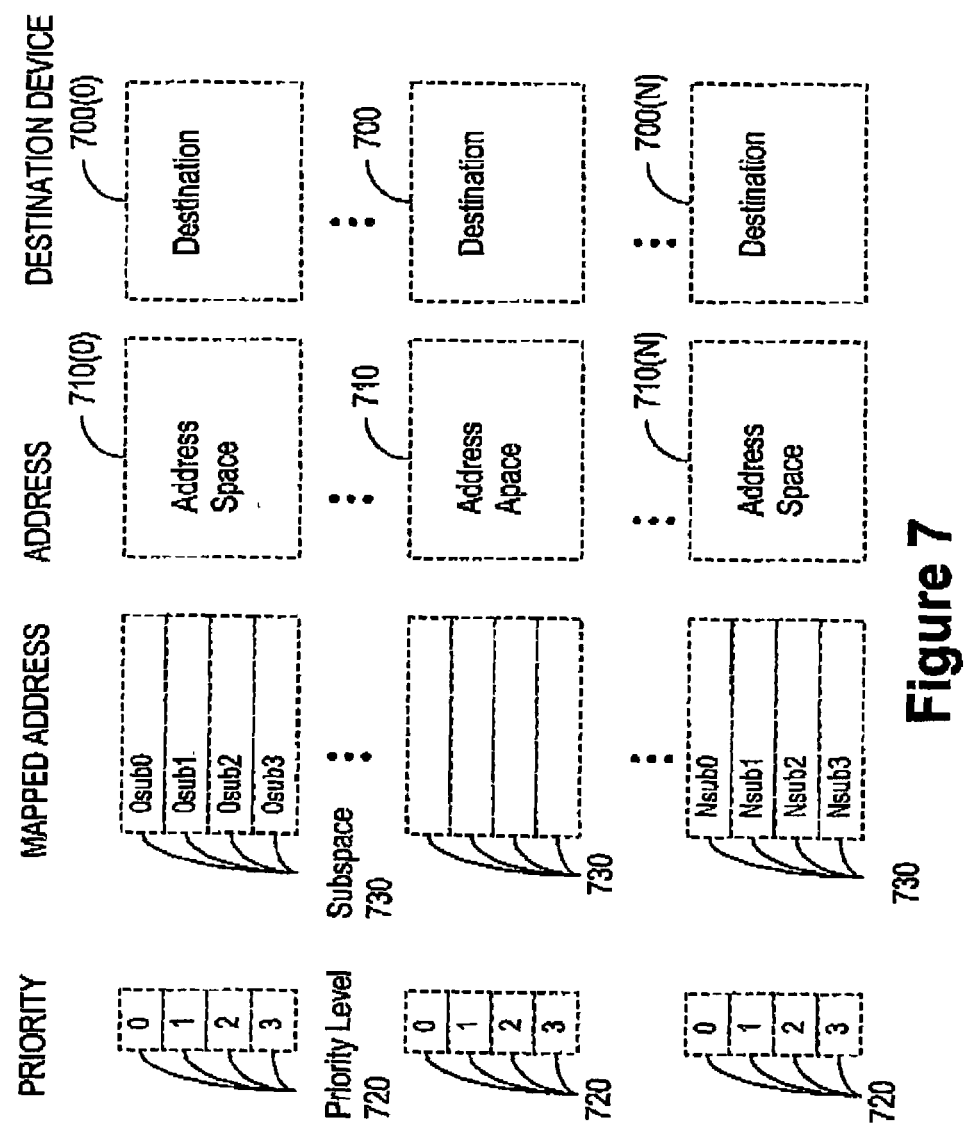
FIG. 7 illustrates in a table, the address alias map of the system disclosed.

Referring to FIG. 7, a first embodiment based on alias addresses is disclosed for incorporating quality of service levels into a switching fabric network that lacks such a feature. It involves modifying the FIFO buffer architecture traditionally used in output buffers to encode priority information in the address so that the buffer contents are read out in priority-encoded order. Such a network includes a number of destinations, 700, each having an associated address space, 710. In order to incorporate quality of service, data packets are each given a priority level, 720. For each destination, 700, the address space, 710 is divided into subspaces, 730, corresponding to priority levels, 720. It is understood that both termini must use this mapping table: the source devices must encode the address corresponding to the priority and the destination device must recognize to which subspace the packets are addressed and organize them accordingly.

Figure 8:
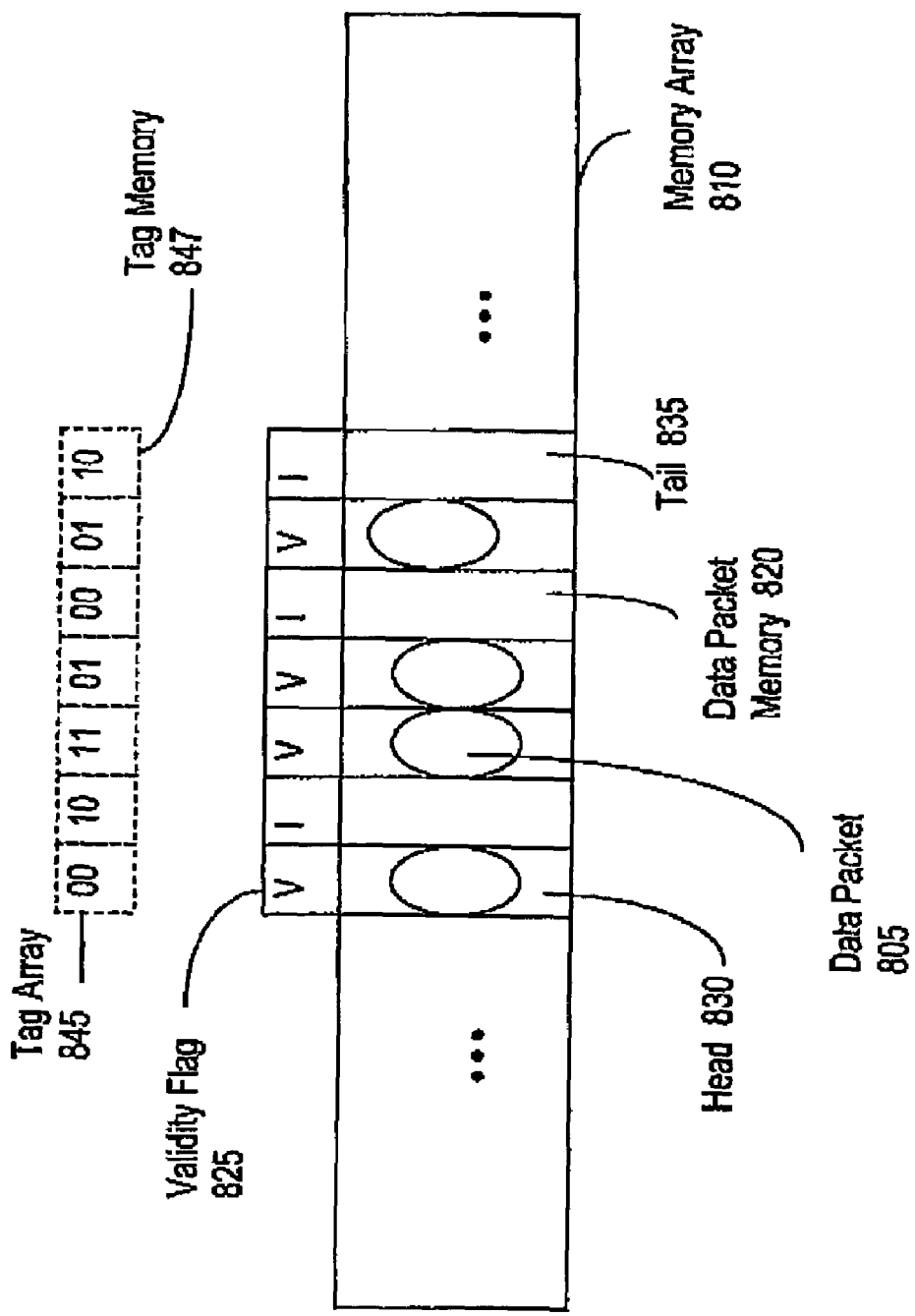
FIG. 8 illustrates a plan of a multi-quality queue of the system disclosed.

Referring to FIG. 8, a second embodiment, for use in processing packets of multiple levels, a buffer is disclosed, 800, for data packets, 805, in a memory array, 810. The memory array includes an output port, 815, a plurality of data packet memories, 820, and a corresponding plurality of validity flags, 825. Associated with the memory array is a tag array, 845. The tag array has a tag memory, 847, for each data packet memories, 820.

Two pointers are used to record the location and age of potentially valid data: a head pointer points to the head data packet memory, 830, and a tail pointer points to the tail data packet memory, 835.

The process of writing the data packets, 805, to the data packet memories, 820, consists of locating the first data packet memories, 820, that is beyond said tail pointer, 835, and has a corresponding invalid validity flag, 825. In this memory element, 820, the packet, 805 is recorded and the corresponding validity flag, 825, is set. If this memory element, 820, was beyond the head pointer, 830, the head pointer must be updated to point at this memory element.

In recording the incoming data packets, 805, the write circuit will inspect the packet, 805, to determine the quality of service(QoS) level associated with the packet, and record a corresponding value in the associated tag memory, 847.

The process of reading the data packets, 805, in the data packet memories, 820, consists of locating the data packet memories, 820, that is A) between the pointers, 830, and 835; B) has a valid corresponding validity flag, 820; C) has as high or higher a QoS priority, (as determined by examining it's corresponding tag, 847,) as any other packet, 805, fulfilling A) and B); and D) is nearer the tail pointer, 835, than any packet fulfilling A),B), and C).

Such a packet is output. The corresponding validity flag, 825, is invalidated. If the output data packet corresponds to the tail pointer, 835, the tail is advanced headward to the next memory element, 820 with a valid corresponding validity flag, 825.

It can be understood from the preceding that the buffer processes packets in an order based firstly on priority and secondly on duration in the buffer.

Figure 9:
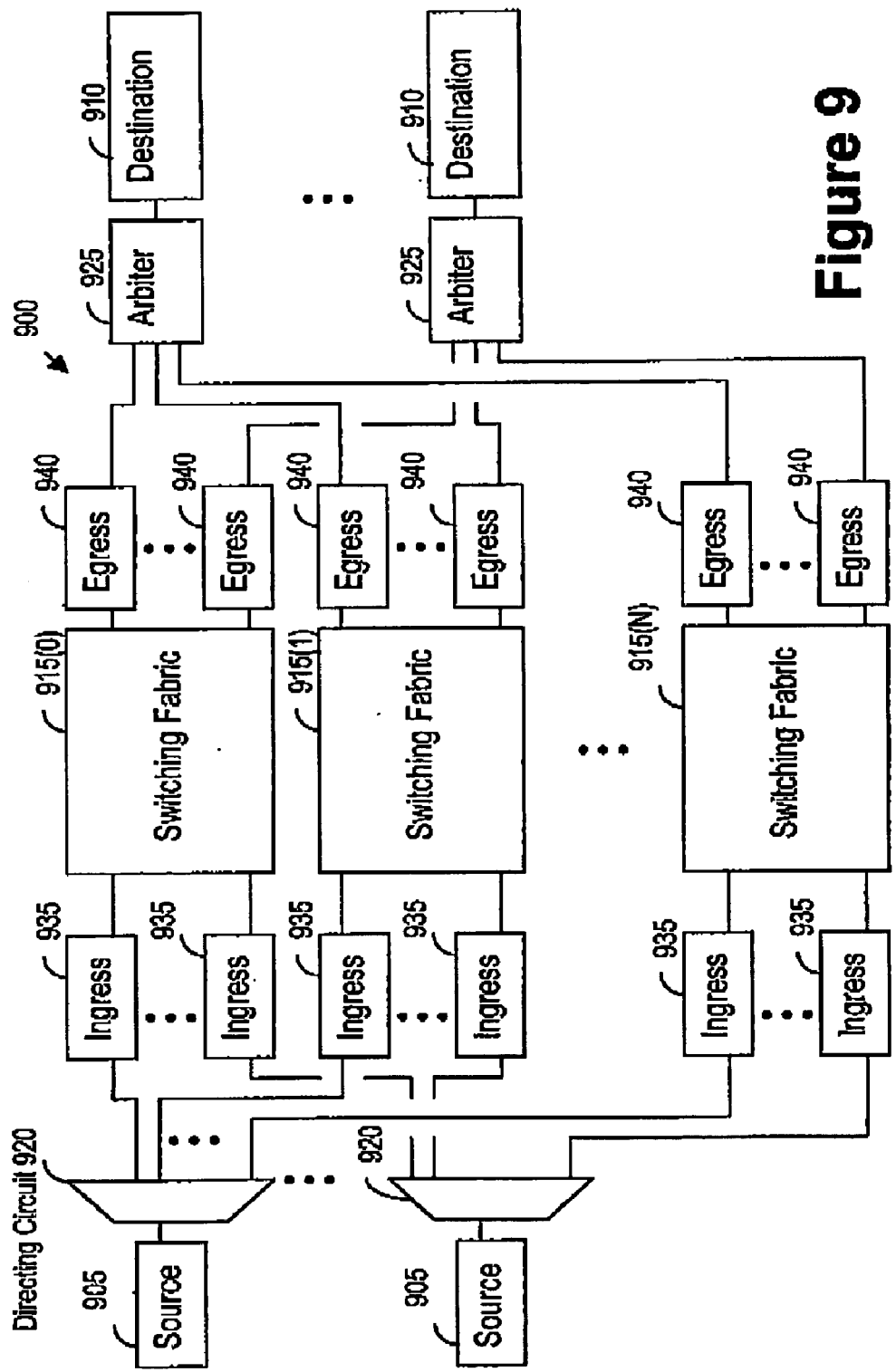
FIG. 9 illustrates schematically the quality by multi-fabric embodiment of the system disclosed.

An alternative embodiment for implementing quality of service based on incorporating one fabric per quality level is as follows. Referring to FIG. 9, we have a network, 900, composed of multiple sources, 905, and multiple destinations, 910. In order to implement N priority levels, N distinct switching fabrics, 915, are provided. Each source, 905, is coupled to a directing circuit 920 for directing packets of a given priority to the appropriate fabric. Each destination, 910, receives packets from a number of fabrics, 915, and is coupled to an arbiter, 925, in order to merge these flows of packets, 930. The fabrics themselves will include such ingress, 935, and egress, 940, buffers necessary to accommodate the traffic circumstances. Those skilled in the art will understand the significance of the arbiters, 925, in the performance of the various priority levels, and select arbiter architecture (e.g. weighted round robin) accordingly.

It can be understood from the preceding that these multiple fabrics provide for a quality of service level per fabric. In addition, application of particular algorithms to this technology (e.g. percentage bandwidth allocation, simple priority, round-robin) can augment the characteristics of the rich grades of service provided. In percentage bandwidth, a running history must be maintained and compared with allocation rules.

There is a need for the techniques above to employ an efficient out-of-order buffer. The system provides a buffer, useful for the aforementioned purposes, implemented from a random access memory, but effective in tracking allocated and free memories for use in out of order reading/writing. This aspect is directed to priority order read out.

Figure 10:
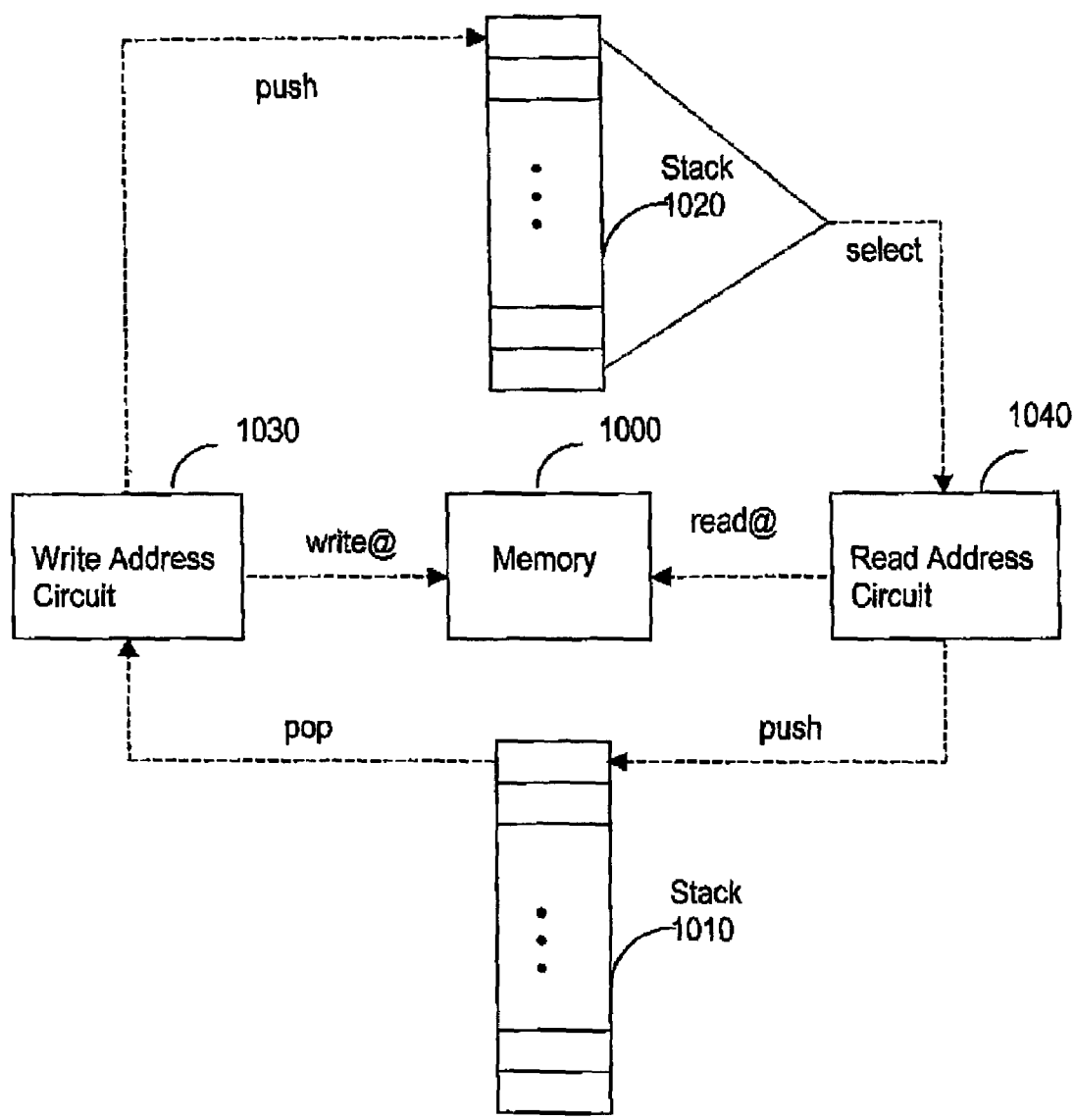
FIG. 10 illustrates schematically a write in-order/read out-of order queue of the system disclosed.

Referring to FIG. 10, a random access memory, 1000, is employed as a queue. The queue, 1000, needs to be read out of order with reference to the write order. In order to achieve this, a free pointer stack, 1010, and an allocated pointer stack, 1020, are maintained.

When a write is required, the write address circuit, 1030, pops the top pointer from the a free pointer stack, 1010, writes a packet to that address in the memory, 1000, and pushes that pointer to the top of the allocated pointer stack.

When a read is required, the read address circuit, 1040, pops the allocated indexed pointer corresponding to the age of the required packet from the allocated pointer stack, 1020. All younger pointers are shifted down the stack. The read address circuit, 1040, then uses the popped pointer to address the memory, 1000, and pushes the pointer onto the free pointer stack, 1010.

Such a buffer allows data to be stored in the order of arrival, and read in a desired order. It can be implemented using a RAM and keeps track of the location of valid packets.

In order to provide for absent debug functionality in a high-speed circuit without increasing latency the buffer management system incorporates ancillary circuitry capable of reliably mirroring port operation on the fly.

High-speed electronics involved may be incompatible with ancillary debug circuits necessary for the system. Incorporating a mirror port without increasing latency is desirable. It is an advantage of the current invention to efficiently provide a data mirror port for debug purposes.

Figure 11:
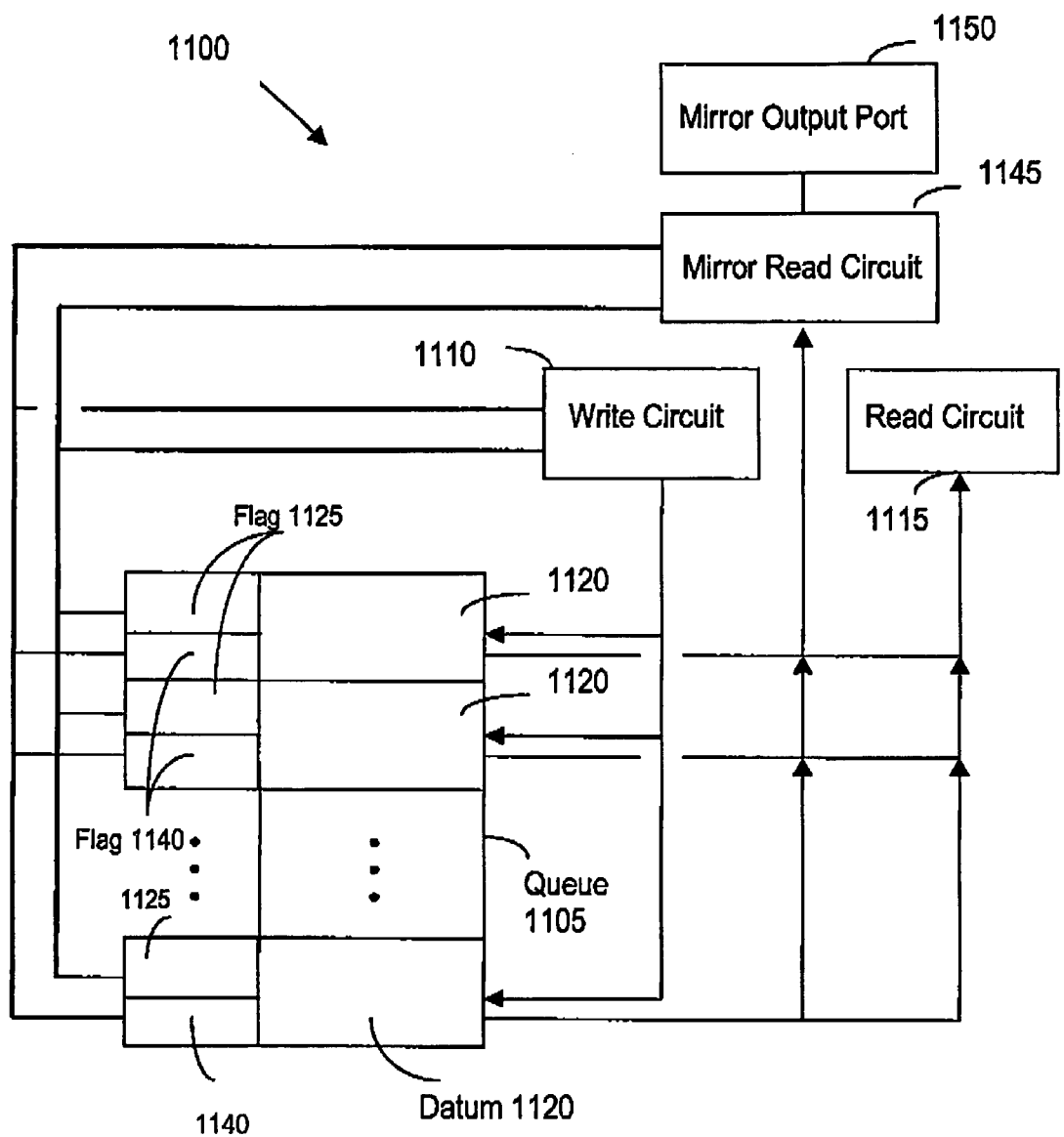
FIG. 11 illustrates a mirror port schematic of the system disclosed.

Referring to FIG. 11, the debug port, 1100, is disclosed. The debug port co-operates with the associated queue, 1105, the associated write circuit, 1110, and the associated read circuit, 1115. Each datum, 1120, in the queue corresponds to a read register flag, 1125, that is set by a read operation to the corresponding datum, 1120, and reset by a write operation to the corresponding datum, 1120.

There is a mirror read circuit, 1145, for coupling datum, 1105, to the mirror output port, 1150.

The debug port includes mirror register flags, 1140, for each datum, 1120. These flags, 1140, are set by a mirror read operation to the corresponding datum, 1120, and reset by a write operation to the corresponding datum, 1120.

Coupled to the write circuit, 1110 are write available signals, 1155, one corresponding to each datum, and that are asserted in response to true states in both corresponding flags, 1125, and 1140.

Coupled to the mirror read circuit, 1145, are mirror request signals, 1160, one corresponding to each datum, and that are asserted in response to a true corresponding read register flag, 1125, and a false corresponding mirror register flag, 1140.

In order to reduce latency associated with a defective rogue transmitting device and provide a central system level access control device access must be articulated by the buffer management system. Congestion caused by the packets of defective devices must be controlled. The buffer management system augments routing tables on a per port basis to provide a system level fault tolerance solution. Once a rogue transmitting defective device is identified, it can be suppressed. The proposed solution may double as security or routing control.

Figure 12:
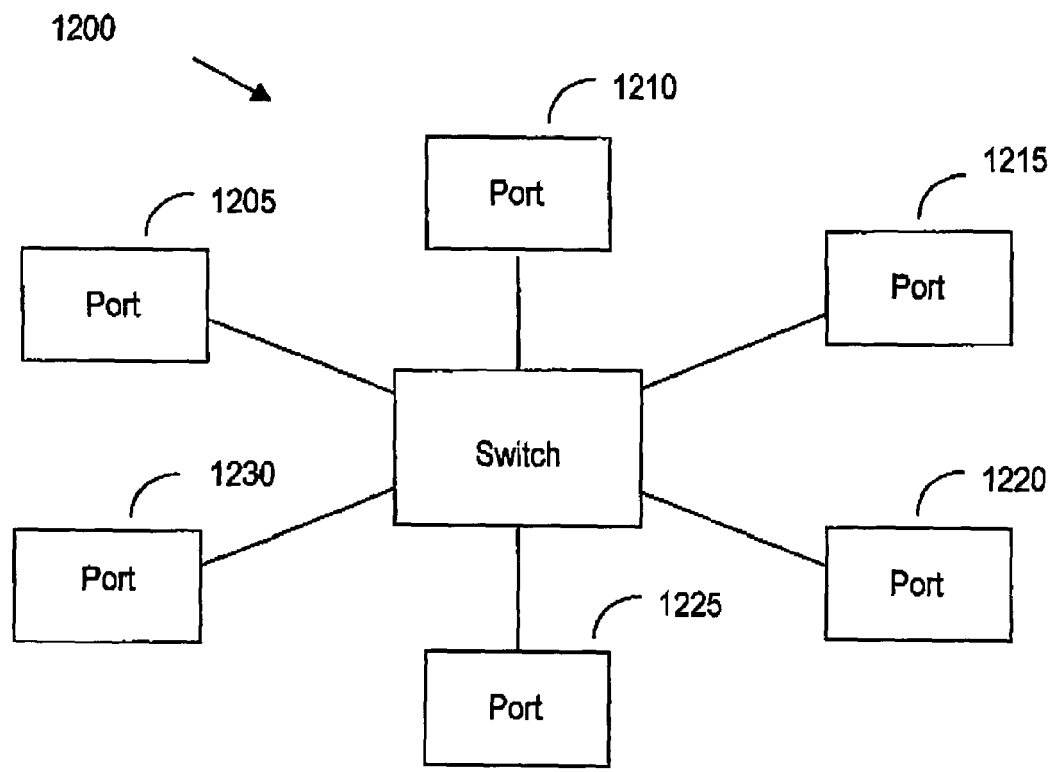
FIG. 12 illustrates a map of a port based network.

Referring to FIG. 12, we have a number of ports 1205–1230, interconnected by a switch.

Referring to FIG. 13 we see the routing tables assigned to each port. X indicates that the table includes the appropriate address. Each relationship is fully programmable. In the tabulated configuration port 1215 is fully trusted (has all access). Ports 1210, 1225 are fully secured, as would be the case for a port that coupled to a defective device. Ports 1205, 1220, 1230 have limited access only.

With per port routing tables as described above it is possible to completely articulate access throughout the system for fault tolerance, security, or traffic flow purposes.

What is claimed is:

1. A buffer management system comprising:
   a plurality of requestors each having an output for a request signal;
   a resource having a plurality of outputs for a request completed signals;
   and an arbiter having:
   a plurality of memory elements, each having:
   an input coupled to one of said plurality of outputs for a request completed signals,
   reset input for an arbiter reset signal,
   an output for providing a mask signal in response to inputs of the memory element;
   a plurality of masking circuits, each having a first input coupled to a corresponding output for providing a mask signal, a second input coupled to a corresponding output for a request signal; and an output for generating a masked request signal;
   a priority encoder for asserting one of a plurality of acknowledgement signals to one of the plurality of requesters; and
   a reset generator having a plurality of inputs coupled to the plurality of masking circuits for asserting said reset signal when no masked request signals are asserted.

2. The buffer management system claimed in claim 1 wherein buffer management system is part of a point-to-point, packet-switched, fabric architecture for use in Gigabyte-per-second chip-to-chip or board-to-board communications.

3. The buffer management system claimed in claim 1 wherein one said plurality of memory elements is comprised of a single flip-flop element and a corresponding masking circuit responds to a single assertion of a corresponding request completed signal.

4. The buffer management system claimed in claim 1 wherein one said plurality of memory elements is:
   comprised of a counter having an input coupled to a corresponding weight signal,
   and wherein a corresponding masking circuit responds to a weighted number of assertions of a corresponding request completed signal.

5. The buffer management system claimed in claim 1 further comprising:
- a buffer having:
  - a plurality of datum elements,
  - a write circuit having a plurality of write available inputs,
  - and a read circuit,
- and a debug port having,
  - an output port,
  - a mirror read circuit for coupling selected said plurality of datum elements to said output port and having a corresponding plurality of mirror request inputs,
  - a read register comprised of a first plurality of status flags, one for each said plurality of datum elements, said first plurality of status flags responsive true to said read circuit and responsive false to said write circuit,
  - a mirror register comprised of a second plurality of status flags, one for each said plurality of datum elements, said second plurality of status flags responsive true to said mirror circuit and responsive false to said write circuit,
- a write available circuit having:
  - means to identify any said plurality of datum elements with both true corresponding one said first plurality of status flags and one said second plurality of status flags,
  - and outputs coupled to corresponding said write available inputs for asserting a write condition in response,
- a mirror detection circuit having:
  - means to identify any said plurality of datum elements with true corresponding one said second plurality of status flags and false one said first plurality of status flags and,
  - and outputs coupled to corresponding said mirror request inputs for asserting a mirror request in response.

6. The buffer management system claimed in claim 5 wherein said buffer management system is part of a point-to-point, packet-switched, fabric architecture for use in Gigabyte-per-second chip-to-chip or board-to-board communications.

7. The buffer management system claimed in claim 1 further comprising:
- a plurality of ports,
  - an access control mechanism
  - and a plurality of routing tables, each one corresponding to one said plurality of ports.

8. The buffer management system of claim 7 wherein said each plurality of routing tables are programmable from each said plurality of ports.

9. The buffer management system of claim 7 wherein said buffer management system is part of a point-to-point, packet-switched, fabric architecture for use in Gigabyte-per-second chip-to-chip or board-to-board communications.

10. The buffer management system claimed in claim 1 further comprising:
- a plurality of sources having a corresponding plurality of queues for data packets;
- a plurality of destinations for receiving said data packets and having means to indicate readiness to receive said data packets;
- and a reordering circuit coupled to one said plurality of queues and having means to identify readiness to receive of said plurality of destinations coupled to said means to indicate, means to identify data packets capable of transmission amongst said data packets in response to said readiness to receive of corresponding said plurality of destinations, and means to reorder said queue such that the oldest said data packets capable of transmission is moved to the front.

11. The buffer management system of claim 10 wherein said data packets are graded into a plurality of priority levels, and wherein one said plurality of destinations indicates a distinct readiness to receive for each said a plurality of priority levels.

12. The buffer management system of claim 10 wherein said buffer management system is part of a point-to-point, packet-switched, fabric architecture for use in Gigabyte-per-second chip-to-chip or board-to-board communications.

13. The buffer management system claimed in claim 1 further comprising:
- a plurality of destinations for receiving data packets having a plurality of priority levels;
- an address space for delivery of said data packets to said plurality of destinations wherein a plurality of addresses address one said plurality of destinations;
- and a mapping table for mapping data packets intended for said one said plurality of destinations and of a first priority level to a first address of said plurality of addresses and data packets intended for said one said plurality of destinations and of a second priority level to a second address of said plurality of addresses.

14. The buffer management system of claim 13 wherein said buffer management system is part of a point-to-point, packet-switched, fabric architecture for use in Gigabyte-per-second chip-to-chip or board-to-board communications.

15. The buffer management system claimed in claim 1 further comprising:
- a plurality of sources for transmitting data packets a plurality of destinations for receiving said data packets having a plurality of priority levels and;
- an address space for delivery of said data packets to said plurality of destinations wherein a plurality of addresses address one said plurality of destinations;
- a first sub-switching fabric for transporting said data packets of a first one of said plurality of priority levels;
- a second sub-switching fabric for transporting said data packets of a second one of said plurality of priority levels;
- a plurality of directing circuits corresponding to said plurality of sources for directing said data packets to the sub-switching fabric corresponding to the priority level of said data packets;
- and a plurality of arbiter circuits corresponding to said plurality of destinations and coupled to said first and second sub-switching fabrics, said arbiters for ordering the traffic of incoming said data packets.

16. The buffer management system of claim 15 wherein said buffer management system is part of a point-to-point, packet-switched, fabric architecture for use in Gigabyte-per-second chip-to-chip or board-to-board communications.

17. The buffer management system of claim 16 wherein said plurality of arbiter circuits are weighted round-robin arbiters.

* * * * *